US010323746B2

(12) United States Patent
Endo et al.

(10) Patent No.: US 10,323,746 B2
(45) Date of Patent: Jun. 18, 2019

(54) METAL BELLOWS TYPE ACCUMULATOR (71) Applicant: EAGLE INDUSTRY CO., LTD., Tokyo (JP)

(72) Inventors: Tetsuya Endo, Tokyo (JP); Hideki Kuriyama, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/566,170

(22) PCT Filed: May 18, 2016

(86) PCT No.: PCT/JP2016/064678
§ 371 (c)(1),
(2) Date: Oct. 12, 2017

(87) PCT Pub. No.: WO2016/194607
PCT Pub. Date: Dec. 8, 2016

(65) Prior Publication Data
US 2018/0087665 A1    Mar. 29, 2018

(30) Foreign Application Priority Data
May 29, 2015    (JP) .................................. 2015-109879

(51) Int. Cl.
*F15B 1/08*     (2006.01)
*F16J 3/04*     (2006.01)
*F15B 1/10*     (2006.01)

(52) U.S. Cl.
CPC ................. *F16J 3/047* (2013.01); *F15B 1/10* (2013.01); *F15B 1/103* (2013.01); *F16J 3/04* (2013.01);
(Continued)

(58) Field of Classification Search
CPC ................ F15B 1/103; F15B 2201/205; F15B 2201/3153; F15B 2201/3158
(Continued)

(56) References Cited

U.S. PATENT DOCUMENTS 2,731,037 A * 1/1956 Schindler .................. F15B 1/08
138/121
6,478,051 B1 * 11/2002 Drumm .................... F15B 1/033
138/30
(Continued)

FOREIGN PATENT DOCUMENTS

CN    103477109 A    12/2013
CN    103867502 A    6/2014
(Continued)

OTHER PUBLICATIONS

First Office Action for Chinese Patent Application No. 201680020238.8 dated Aug. 29, 2018 (7 pages) and partial translation (3 pages).
(Continued)

*Primary Examiner* — Patrick F Brinson
(74) *Attorney, Agent, or Firm* — Harness, Dickey & Pierce, P.L.C.

(57) ABSTRACT

The invention provides a metal bellows type accumulator having an outer shell provided in its one end with a pressure introducing passage in an opening manner, and a metal bellows repeatedly formed peak portions directed to an outer side in a radial direction and trough portions directed to an inner side, capable of expanding and contracting in an axial direction and separating an inner chamber of the outer shell into a pressure introducing chamber communicated with the pressure introducing passage and a gas chamber charged with cushion gas. A tubular portion is provided at a position where an amplitude of vibration in a radial direction becomes maximum in the metal bellows, has a greater diameter than a maximum diameter portion of each of the
(Continued)

peak portions and is in contactable with an inner peripheral surface of the outer shell at a predetermined width in the axial direction.

4 Claims, 5 Drawing Sheets

(52) U.S. Cl.
CPC . *F15B 2201/205* (2013.01); *F15B 2201/3153* (2013.01)

(58) Field of Classification Search
USPC .............................................. 138/31, 30, 26
See application file for complete search history.

(56) References Cited

U.S. PATENT DOCUMENTS

| | | | |
|---|---|---|---|
| 6,527,012 B1 * | 3/2003 | Weber ..................... | F15B 1/103 138/30 |
| 6,622,755 B2 * | 9/2003 | Weber ..................... | F15B 1/103 138/30 |
| 2014/0110906 A1 | 4/2014 | Champion et al. | |
| 2014/0311604 A1 | 10/2014 | Yoshihara | |
| 2018/0066679 A1 | 3/2018 | Arikawa et al. | |

FOREIGN PATENT DOCUMENTS

| | | |
|---|---|---|
| CN | 107407297 A | 11/2017 |
| DE | 10 2010 062684 A1 | 6/2012 |
| EP | 3279481 A1 | 2/2018 |
| JP | H02-113139 A | 4/1990 |
| JP | H03-129174 A | 6/1991 |
| JP | H07-029303 U | 6/1995 |
| JP | 2858807 B2 | 2/1999 |
| JP | 2005-098391 A | 4/2005 |
| JP | 2005-282730 A | 10/2005 |
| JP | 2006-170245 A | 6/2006 |
| JP | 2009-133368 A | 6/2009 |
| JP | 2014-005882 A | 1/2014 |

OTHER PUBLICATIONS

Extended European Search Report for Patent Application No. EP16803042.7 dated Jun. 13, 2018 (8 pages).

* cited by examiner

METAL BELLOWS TYPE ACCUMULATOR

CROSS-REFERENCE TO RELATED APPLICATIONS

This application is a U.S. National Stage Application of International Application No. PCT/JP2016/064678, filed on May 18, 2016, and published in Japanese as WO 2016/194607 A1 on Dec. 8, 2016 and claims priority to Japanese Application No. 2015-109879, filed on May 29, 2015. The entire disclosures of the above applications are incorporated herein by reference.

BACKGROUND OF THE INVENTION

Field of the Invention

The present invention relates to an accumulator which is used in a fluid pressure line such as a hydraulic system or a pneumatic system, and more particularly to a metal bellows type accumulator which employs a metal bellows as a separating means of cushion gas and fluid pressure.

Description of the Conventional Art

The accumulator is a device which is used in the fluid pressure line such as the hydraulic system or the pneumatic system, and is generally used for a pressure control which temporarily stores the fluid pressure by utilizing compressibility of nitrogen gas or absorbs pulsation of pressure generated in the pressure line so as to make the pulsation smooth. There are an accumulator which employs a bladder as the separating means between the cushion gas constructed by the nitrogen gas and the fluid pressure, and an accumulator which employs a piston or a metal bellows as the separating means. Among them, the metal bellows type accumulator can hold down permeation leakage of the gas to approximately 0, and has a high durability.

Figure 5:
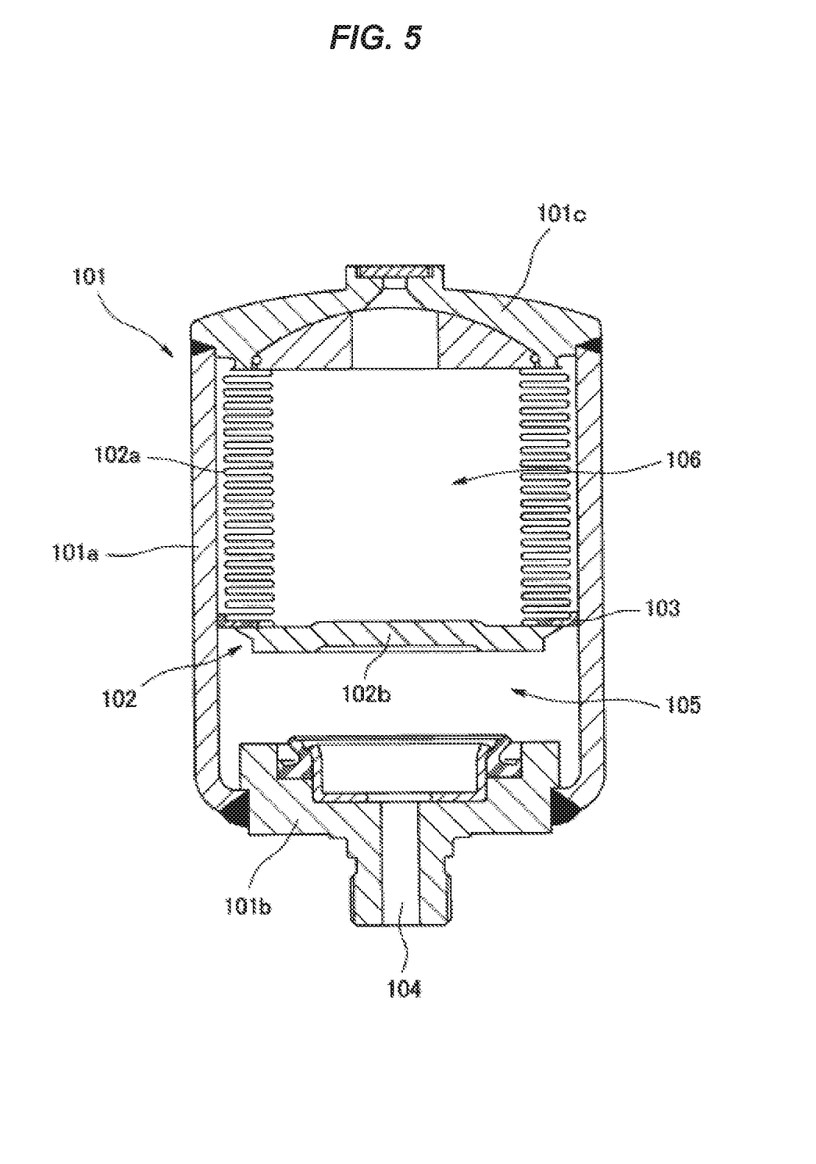
FIG. 5 is a cross sectional view showing an embodiment of a conventional metal bellows type accumulator.

As the metal bellows type accumulator, there has been conventionally known a structure, for example, as shown in FIG. 5. The metal bellows type accumulator is provided with an outer shell 101, a metal bellows 102 and a vibration damping ring 103. The outer shell 101 is constructed by a cylindrical shell 101a, and first and second end covers 101b and 101c which are provided in such a manner as to close both ends of the shell 101a. The metal bellows 102 is constructed by a bellows main body 102a which is fixed its one end to the second end cover 101c by welding, can expand and contract in an axial direction and is made of a metal, and a bellows cap 102b which is attached by welding in such a manner as to close an opening in a free end side of the bellows main body 102a. The vibration damping ring 103 is attached to an outer periphery of a free end of the metal bellows 102 (the bellows main body 102a). A pressure introducing passage 104 is provided in an opening manner in the first end cover 101b. Further, an outer peripheral surface of the vibration damping ring 103 does not come into close contact with an inner peripheral surface of the shell 101a, and a clearance (not shown) allowing communication of the fluid exists between the both.

An inner chamber of the outer shell 101 is separated into a pressure introducing chamber 105 and a gas chamber 106 by the metal bellows 102. Among them, the pressure introducing chamber 105 is introduced the fluid pressure of the fluid pressure line (not shown) via a pressure introducing passage 104, and the gas chamber 106 in an inner side of the metal bellows 102 is charged the cushion gas such as N2 gas.

This kind of metal bellows type accumulator is structured such that the metal bellows 102 displaces in an expansion and contraction manner so that the fluid pressure introduced into the pressure introducing chamber 105 from the fluid pressure line (not shown) via the pressure introducing passage 104, and the pressure of the cushion gas charged in the gas chamber 106 form an equilibrium state each other. More specifically, when the fluid pressure in the fluid pressure line introduced into the pressure introducing chamber 105 rises, the metal bellows 102 stores the rising pressure by increasing a volumetric capacity of the pressure introducing chamber 105 as well as the bellows cap 102b displaces to the second end cover 101c side together with the compression of the bellows main body 102a and reduces the volumetric capacity of the gas chamber 106. When the fluid pressure in the fluid pressure line comes down, the metal bellows 102 discharges the stored pressure to the fluid pressure line by reducing the volumetric capacity of the pressure introducing chamber 105 as well as the bellows cap 102b displaces to the first end cover 101b side together with the expansion of the bellows main body 102a and increases the volumetric capacity of the gas chamber 106, on the basis of the pressure in the gas chamber 106 which is relatively high. Further, in the operation mentioned above, the vibration damping ring 103 is structured such as to suppress deflection in a radial direction of the free end of the metal bellows 102 (refer, for example, to the following prior art documents).

However, the deflection in the radial direction according to the expanding and contracting operation of the metal bellows 102 is also enlarged in the other portions than the free end of the metal bellows 102, for example, in an intermediate portion in the axial direction of the bellows main body 102a, in some vibration mode, in addition to the free end of the metal bellows 102. As a result, it is desired to prevent the durability from being lowered, even if the metal bellows 102 comes into contact with an inner peripheral surface of the shell 101a by the eccentric operation caused by the vibration.

The present invention is made by taking the above points into consideration, and an object of the present invention is to provide a metal bellows type accumulator which does not cause reduction of durability due to contact of the metal bellows with the inner peripheral surface of the outer shell on the basis of the vibration of the metal bellows in the radial direction.

SUMMARY OF THE INVENTION

The present invention employs the following means for achieving the object mentioned above.

More specifically, a metal bellows type accumulator according to the present invention is provided with an outer shell which is provided in its one end with a pressure introducing passage in an opening manner, and a metal bellows which is repeatedly formed peak portions directed to an outer side in a radial direction and trough portions directed to an inner side, is capable of expanding and contracting in an axial direction and separates an inner chamber of the outer shell into a pressure introducing chamber which is communicated with the pressure introducing passage and a gas chamber which is charged with cushion gas, and is structured such that a tubular portion is provided at a position where an amplitude of vibration in a radial direction becomes maximum in the metal bellows, the tubular portion having a greater diameter than a maximum diameter portion of each of the peak portions and being in contactable with an inner peripheral surface of the outer shell at a predetermined width in the axial direction (claim 1).

The metal bellows type accumulator having the structure mentioned above is structured such that the metal bellows constructed by the peak portions and the trough portions expands and contracts in the axial direction so that the fluid pressure introduced into the pressure introducing chamber via the pressure introducing passage and the pressure of the cushion gas charged in the gas chamber form an equilibrium state each other. In the case that the deflection in the radial direction is generated in the metal bellows in the course of the operation mentioned above, it is possible to prevent the maximum diameter portion of each of the peak portions from being in contact with the inner peripheral surface of the outer shell by the contact of the tubular portion having the greater diameter than the maximum diameter portion of each of the peak portions with the inner peripheral surface of the outer shell. Alternatively, it is possible to effectively reduce a load when the maximum diameter portion of each of the peak portions comes into contact with the inner peripheral surface of the outer shell. Further, since the tubular portion has a predetermined width in the axial direction, a contact area becomes greater and it is possible to effectively reduce the load of the tubular portion itself.

Moreover, the present invention may further employ the following means for achieving the above object.

More specifically, an outer peripheral surface of the maximum diameter portion of each of the peak portions in the metal bellows is coated with a protection layer which is constructed by a cushioning material (claim 2), in the metal bellows type accumulator (claim 1) having the structure mentioned above.

According to the structure mentioned above, since the eccentricity of the metal bellows is maintained even after the tubular portion formed in the metal bellows is in contact with the inner peripheral surface of the outer shell, an impact applied to the maximum diameter portion of the peak portion can be effectively reduced by the protection layer constructed by the cushioning material even when the maximum diameter portion of each of the peak portions of the metal bellows comes into contact with the inner peripheral surface of the outer shell.

Further, in the metal bellows type accumulator having the structure mentioned above (claim 1 or 2), an outer peripheral surface of the tubular portion formed in the metal bellows is coated with a protection layer which is constructed by a cushioning material (claim 3).

According to the structure mentioned above, it is possible to effectively reduce the impact applied to the tubular portion when the tubular portion formed in the metal bellows comes into contact with the inner peripheral surface of the outer shell, by means of the protection layer which is constructed by the cushioning material.

Effect of the Invention

On the basis of the metal bellows type accumulator according to the present invention, even if the deflection in the radial direction is generated in the metal bellows, the tubular portion provided in the metal bellows comes into contact with the inner peripheral surface of the outer shell in advance. As a result, it is possible to prevent the maximum diameter portion of each of the peak portions from coming into contact with the inner peripheral surface of the outer shell or reduce the load at the contacting time, and it is also possible to hold down the load of the tubular portion itself. Therefore, it is possible to secure an excellent durability of the metal bellows.

DETAILED DESCRIPTION OF PREFERRED EMBODIMENTS

A description will be given below of preferable embodiments of a metal bellows type accumulator according to the present invention with reference to the accompanying drawings.

Figure 1:
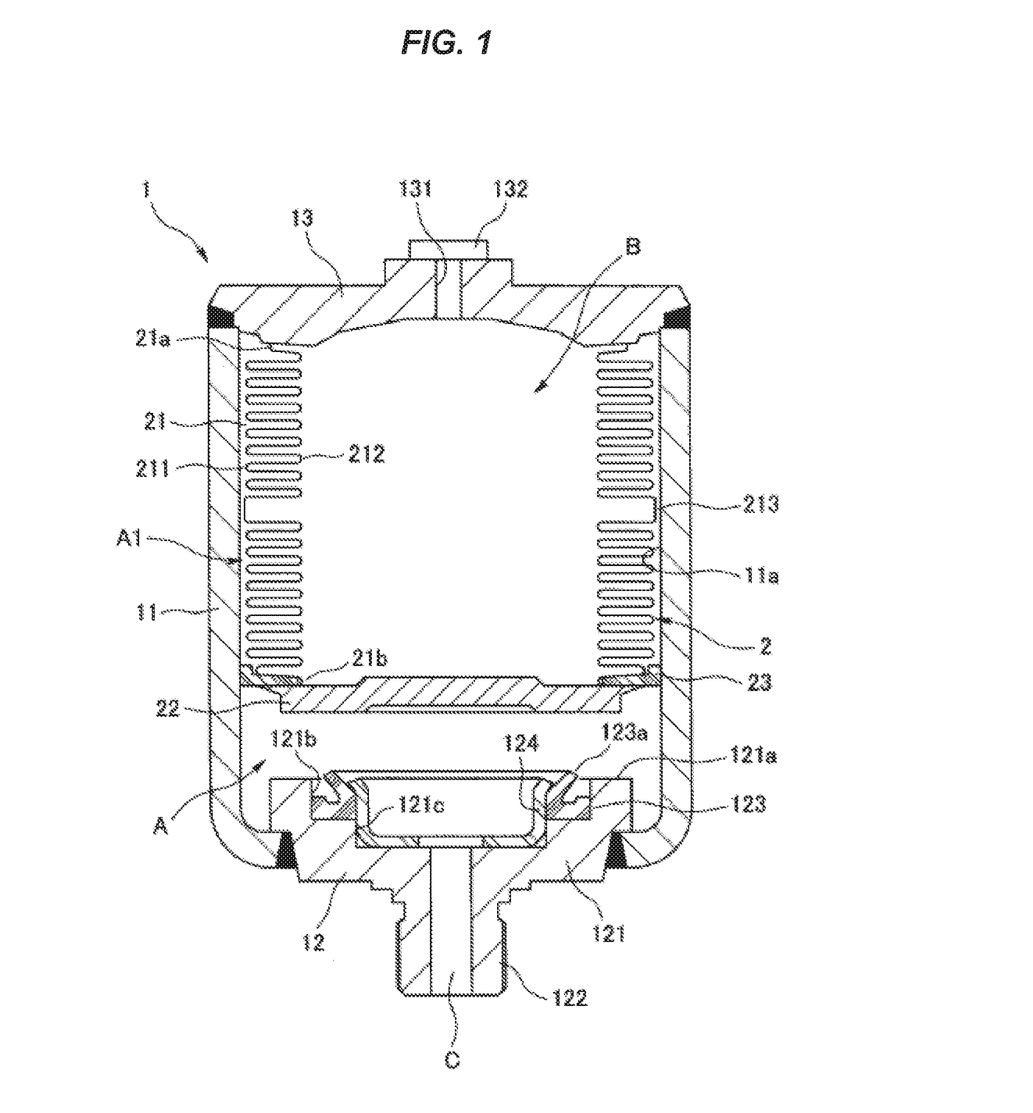
FIG. 1 is a cross sectional view showing a first embodiment of a metal bellows type accumulator according to the present invention.

First of all, a first embodiment shown in FIG. 1 is obtained by applying the present invention to a metal bellows type accumulator called as "internal gas structure" in which an outside space of a metal bellows is set to a pressure introducing chamber and an inside space of the metal bellows is set to a gas chamber. Reference numeral 1 denotes an outer shell and reference numeral 2 denotes a metal bellows.

The outer shell 1 is provided with a shell 11 which is formed into a cylindrical shape, a first end cover 12 which is provided in one end in an axial direction of the shell 11, and a second end cover 13 which is provided in the other end in the axial direction of the shell 11. The shell 11, the first end cover 12 and the second end cover 13 are all manufactured by metal.

The first end cover 12 in the outer shell 1 has a flange portion 121 which is integrally bonded its outer periphery to one end in the axial direction of the shell 11, and a joint portion 122 which protrudes out of its inner periphery to an outer side, and a pressure introducing passage C is provided in an opening manner in an inner periphery of the joint portion 122.

The second end cover 13 in the outer shell 1 is bonded its outer periphery to the other end in the axial direction of the shell 11 by welding. Further, a gas charge port 131 is provided in an opening manner in a center portion of the second end cover 13, and the gas charge port 131 is provided for charging cushion gas such as N2 gas into the gas chamber B in the inner side of the metal bellows 2 and is sealed by a gas plug 132.

The metal bellows 2 is structured such as to separate the inner chamber of the outer shell 1 into the pressure introducing chamber A which is communicated with the pressure introducing passage C, and the gas chamber B which is charged with the cushion gas. The metal bellows is constructed by a bellows main body 21 and a discoid bellows cap 22 and can expand and contract in relation to the axial direction. The bellows main body 21 is bonded to the second end cover 13 by welding in one end (a fixed end) 21a in the axial direction, is repeatedly formed peak portions 211 and trough portions 212, and is made of metal. The discoid bellows cap 22 is bonded to and integrated with the other end (a free end) 21*b* of the bellows main body 21 by welding in its outer peripheral portion. The peak portions 211 are continuous in a circumferential direction toward an outer side in a radial direction, and the trough portions 212 are continuous in the circumferential direction toward an inner side in the radial direction.

When the metal bellows 2 is oscillated in the radial direction, a tubular portion 213 is formed in an intermediate portion in the axial direction of the bellows main body 21 which corresponds to an antinode of vibration in a stationary wave having node of the vibration in both ends in the axial direction thereof (where amplitude of the vibration in the radial direction becomes maximum).

Figure 2:
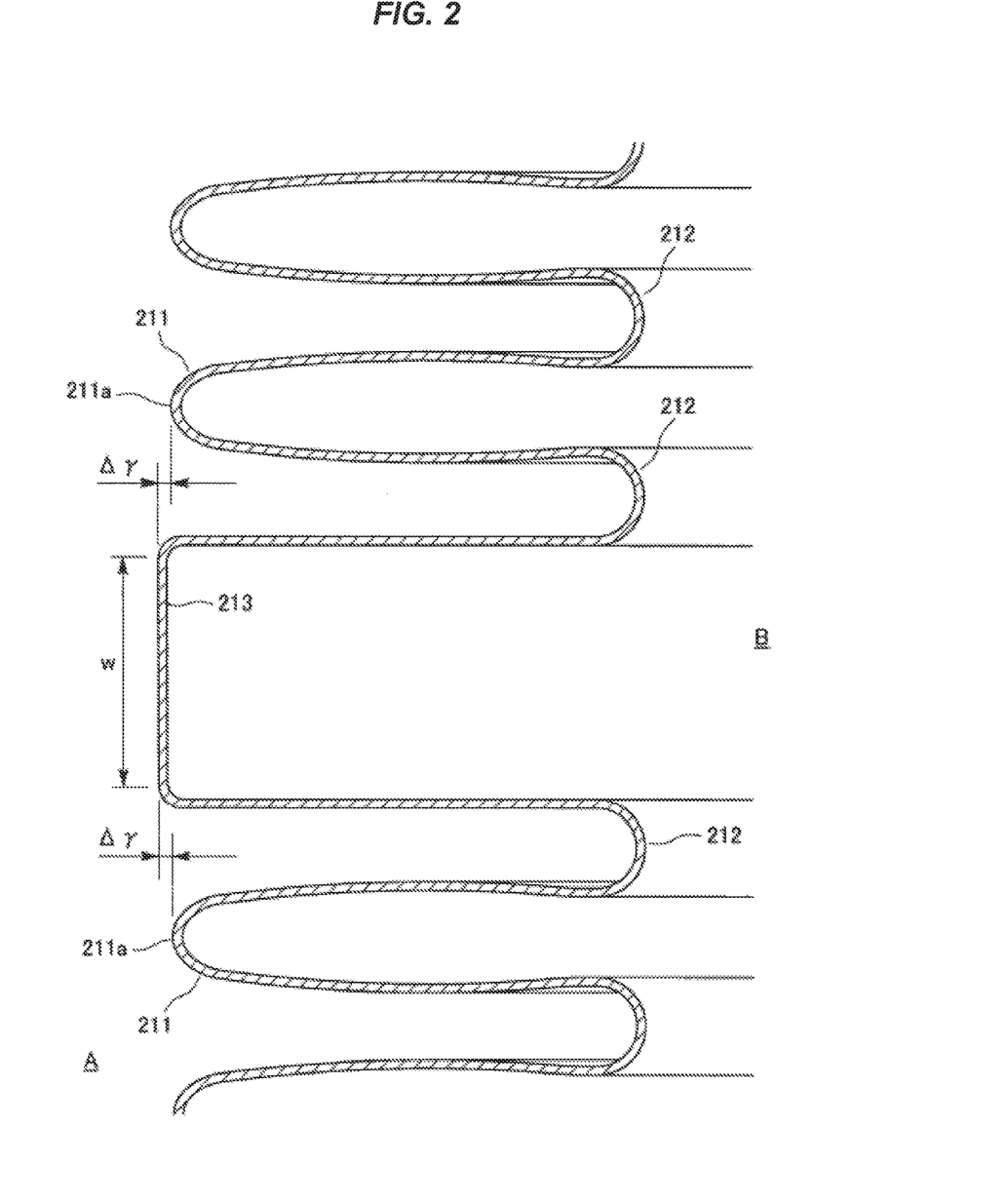
FIG. 2 is a cross sectional view showing a substantial part in the first embodiment of the metal bellows type accumulator according to the present invention in an enlarged manner.

The tubular portion 213 has a diameter which is Δr larger than a maximum diameter portion 211*a* of each of the peak portions 211 in the bellows main body 21, as shown in FIG. 2 in an enlarged manner, is formed into a cylindrical surface in its outer peripheral surface, and can come into contact with the inner peripheral surface 11*a* of the shell 11 in the outer shell 1 with a predetermined width w in the axial direction when the metal bellows 2 is oscillated in the radial direction.

A vibration damping ring 23 is attached to an outer periphery of the free end 21*b* of the metal bellows 2 (the bellows main body 21). The vibration damping ring 23 is structured such as to restrict displacement of the free end 21*b* of the bellows main body 21 in the radial direction, and is formed into a shape which has a clearance in relation to the inner peripheral surface 11*a* of the shell 11, so as to prevent an outer peripheral space A1 of the bellows main body 21 corresponding to a part of the pressure introducing chamber A from being sealed.

Circular concave portions 121*b* and 121*c* are concentrically formed in the flange portion 121 of the first end cover 12 in the outer shell 1 so as to be positioned in an outer periphery of an inner end of the pressure introducing passage C. Among them, a seal member 123 is installed to the large-diameter concave portion 121*b*, and an annular seal holder 124 is fitted and attached to the small-diameter concave portion 121*c*, the annular seal holder 124 supporting the seal member 123 from an inner peripheral side and being made of the metal.

The seal member 123 is formed by a rubber elastic body, has a seal lip 123*a* which a shape which is directed to the bellows cap 22 side of the metal bellows 2 and is open to an outer peripheral side, and is structured such as to obstruct between the pressure introducing chamber A and the pressure introducing passage C on the basis of the close contact of the bellows cap 22 with the seal lip 123*a* when the bellows cap 22 in the free end of the metal bellows 2 comes into contact with the inner end 121*a* of the flange portion 121 in the first end cover 12 by the elongation of the metal bellows 2.

The metal bellows type accumulator having the structure mentioned above is structured such that the joint portion 122 (the pressure introducing passage C) of the first end cover 12 is connected to a fluid pressure line (not shown). Further, in the case that the pressure of working fluid flowing within a piping of the fluid pressure line becomes higher than the charge pressure of the cushion gas within the gas chamber B, the working fluid flows into the pressure introducing chamber A through the pressure introducing passage C of the first end cover 12, and the metal bellows 2 is compressed. Further, in the case that the fluid pressure within the piping of the fluid pressure line is lowered from this state, the metal bellows 2 is elongated by the pressure in the gas chamber B, and the working fluid within the pressure introducing chamber A is discharged out to the fluid pressure line.

Here, in the case that the metal bellows 2 is elongated together with the reduction of the fluid pressure within the pressure introducing chamber A, a length of elongation is restricted by the contact of the bellows cap 22 in the free end of the metal bellows 2 with the inner end 121*a* of the flange portion 121 in the first end cover 12. Further, at this time, the pressure introducing chamber A and the pressure introducing passage C are obstructed therebetween since the bellows cap 22 of the metal bellows 2 comes into close contact with the leading end of the seal lip 123*a* in the seal member 123. Therefore, the pressure in the pressure introducing chamber A is not lowered but can be kept in a state in which the pressure in the pressure introducing chamber A is approximately equalized the pressure in the gas chamber B even if the fluid pressure of the fluid pressure line is further lowered thereafter. As a result, any excessive load caused by differential pressure between the pressure introducing chamber A and the gas chamber B does not act on the bellows main body 21 of the metal bellows 2.

Further, the deflection to the radial direction is generated in the metal bellows 2 in conjunction with the expanding and contracting operation as mentioned above. In the case that the vibration is the stationary wave in which the fixed end 21*a* of the bellows main body 21 is set to the node and the free end 21*b* is set to the antinode, the vibrating displacement (the eccentric motion) in the radial direction of the free end 21*b* is restricted by the vibration damping ring 23. As a result, it is possible to effectively prevent the free end 21*b* of the bellows main body 21 and the vicinity thereof from being damaged by the contact with the inner peripheral surface 11*a* of the shell 11 in the outer shell 1.

Further, in the case that the vibration to the radial direction in conjunction with the expansion and contraction of the metal bellows 2 is the stationary wave in which the fixed end 21*a* and the free end 21*b* of the bellows main body 21 are set to the node, and the intermediate portion in the axial direction is set to the antinode, the outer peripheral surface of the tubular portion 213 formed in the intermediate portion in the axial direction of the bellows main body 21 comes into contact with the inner peripheral surface 11*a* of the shell 11 in the outer shell 1 in advance in the course of the vibrating displacement, and suppresses the further eccentric motion. As a result, it is possible to effectively prevent the maximum diameter portion 211*a* of each of the peak portions 211 in the bellows main body 21 from being damaged by the contact with the inner peripheral surface 11*a* of the shell 11. Further, since the tubular portion 213 has the predetermined width w in the axial direction, the contact area thereof with the inner peripheral surface 11*a* of the shell 11 is great. As a result, it is possible to effectively reduce the load to which the tubular portion 213 itself is applied due to the contact.

Figure 3:
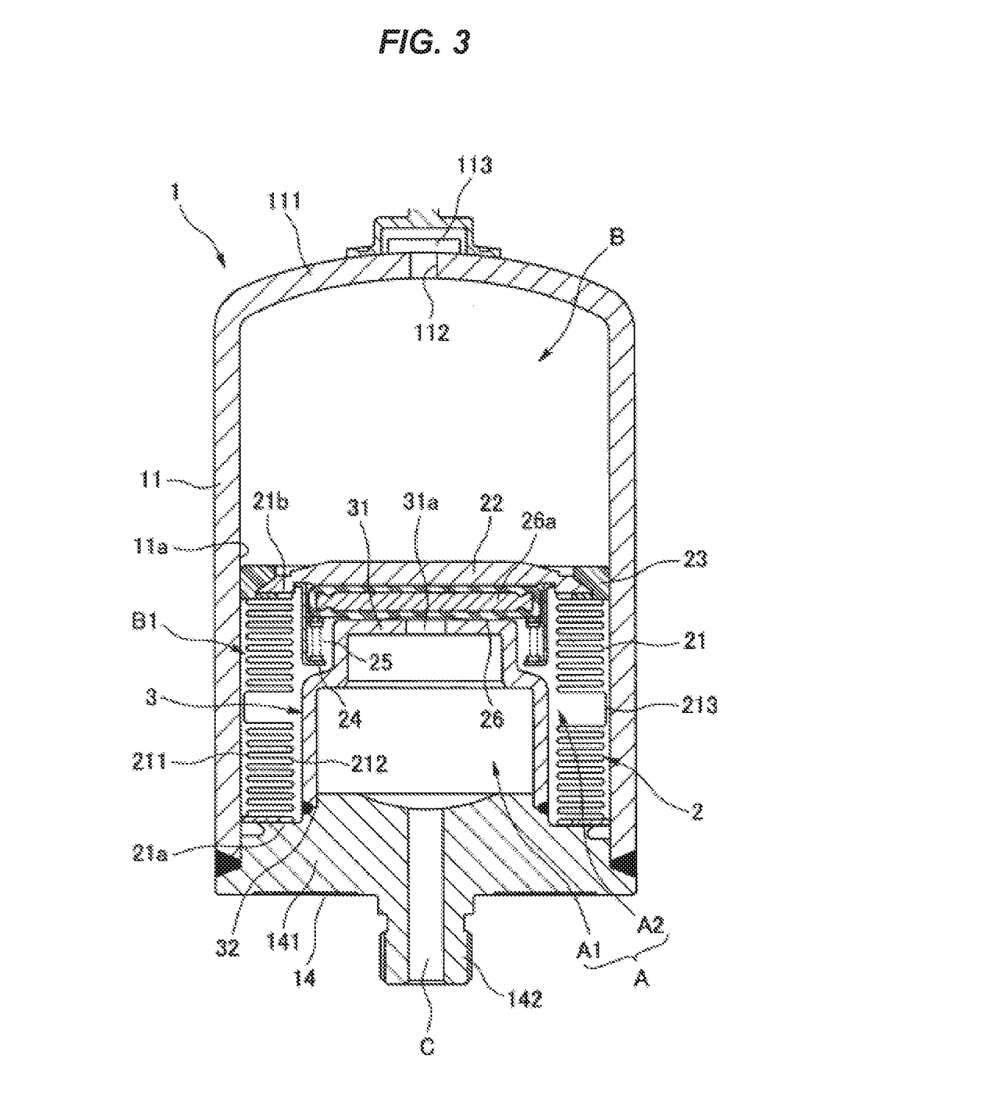
FIG. 3 is a cross sectional view showing a second embodiment of the metal bellows type accumulator according to the present invention.

Next, FIG. 3 shows a second embodiment to which the present invention is applied, with regard to a metal bellows type accumulator called as "external gas structure" in which an inside space of the metal bellows 2 is set to the pressure introducing chamber A and an outside space of the metal bellows 2 is set to the gas chamber B.

More specifically, in the metal bellows type accumulator shown in FIG. 3, the outer shell 1 is constructed by a shell 11 which is formed into a closed-end cylindrical shape, and an end cover 14 which is provided in one end in an axial direction of the shell 11. The end cover 14 has a flange portion 141 which is bonded its outer periphery to one end in an axial direction of the shell 11 by welding, and a joint portion 142 which protrudes out of an inner periphery thereof to an outer side, and a pressure introducing passage C communicating with the pressure introducing chamber A in the inner side of the metal bellows 2 is provided in an opening manner in an inner periphery of the joint portion 142. Further, a gas charge port 112 is provided in an opening manner in a center portion of a bottom portion 111 in an opposite side to the end cover 14 in the shell 11, and the gas charge port 112 is provided for charging the cushion gas such as N2 gas into the gas chamber B in the outer side of the metal bellows 2, and is sealed by a gas plug 113.

The metal bellows 2 is structured such that one end (a fixed end) 21a in an axial direction is bonded to the end cover 14 by welding, is constructed by a bellows main body 21 in which peak portions 211 and trough portions 212 are repeatedly formed and is made of metal, and a discoid bellows cap 22 which is bonded to and integrated with the other end (a free end) 21b in the axial direction of the bellows main body 21 in its outer peripheral portion by welding and serves as an end plate, and can expand and contract in relation to the axial direction. The peak portions 211 are continuous in a circumferential direction toward an outer side in a radial direction and the trough portions 212 are continuous in the circumferential direction toward an inner side in the radial direction.

Further, in the embodiment shown in FIG. 3, in the same manner as the first embodiment which is previously described, a tubular portion 213 is formed in an intermediate portion in the axial direction of the bellows main body 21 corresponding to the antinode of the vibration in the stationary wave having the nodes of the vibration in both ends in the axial direction of the metal bellows 2 (where the amplitude of the vibration in the radial direction becomes maximum). The tubular portion 213 has a diameter which is greater than the maximum diameter portion of each of the peak portions 211, is formed into a cylindrical surface in its outer peripheral surface and can comes into contact with the inner peripheral surface 11a of the shell 11 in the outer shell 1 with a predetermined width to the axial direction on the basis of the oscillation in the radial direction.

A closed-end cylindrical stay 3 is arranged in the pressure introducing chamber A in the inner side of the metal bellows 2, the stay 3 restricting displacement of the metal bellows 2 in the compressing direction. A bottom portion 31 thereof and an end edge portion 32 in an opposite side are bonded to the end cover 14 by welding. Further, a communication hole 31a is provided in an opening manner in a center portion of the bottom portion 31 which is directed to the bellows cap 22 side in the stay 3.

A vibration damping ring 23 is attached to an outer periphery of the bellows cap 22 of the metal bellows 2. The vibration damping ring 23 is structured such as to restrict the displacement in the diametrical direction for preventing the free end 21b of the bellows main body 21 from coming into contact with the inner peripheral surface 11a of the shell 11 in the outer shell 1, and is formed into a shape having a clearance between the vibration damping ring 23 and the inner peripheral surface 11a of the shell 11 so as to prevent an outer peripheral space B1 of the bellows main body 21 which is a part of the gas chamber B from being sealed.

A seal member 26 is retained to the pressure introducing chamber A side in the bellows cap 22 of the metal bellows 2 via an annular holder 24 and a spring 25 which is attached to the holder 24, in a state of being movable in the axial direction. The seal member 26 is formed so as to cover a disc 26a made of the metal with a rubber elastic body, and is structured such as to close the communication hole 31a by being pressed against the bottom portion 31 of the stay 3 by means of the bellows cap 22 when the metal bellows 2 displaces to a stroke end position in the compressing direction.

More specifically, in a state in which the seal member 26 is away from the bottom portion 31 of the stay 3 and opens the communications hole 31a on the basis of the elongation of the metal bellows 2, an inside space A1 of the stay 3 connected to the pressure introducing passage C of the end cover 14 and a space A2 between the stay 3 and the metal bellows 2 construct the pressure introducing chamber A where the spaces A1 and A2 are communicated with each other through the communication hole 31a. In a state in which the seal member 26 is brought into close contact with the bottom portion 31 of the stay 3 and closes the communication hole 31a on the basis of the compression of the metal bellows 2, the inside space A1 of the stay 3 and the space A2 between the stay 3 and the metal bellows 2 are obstructed therebetween, and the fluid pressure in the inside space A1 does not reach the space A2.

The metal bellows type accumulator having the structure mentioned above is used by connecting a joint portion 142 of the end cover 14 to a fluid pressure line (not shown). Further, in the case that the pressure of the working fluid flowing within the piping of the fluid pressure line becomes higher than the charge pressure of the cushion gas within the gas chamber B, the working fluid flows into the inside space A1 of the stay 3 from the pressure introducing passage C in an inner periphery of the end cover 14, and further into the space A2 between the stay 3 and the metal bellows 2 through the communication hole 31a of the stay 3 from the space A1. Therefore, the metal bellows 2 is elongated so that the volumetric capacity of the gas chamber B is reduced and the pressure thereof forms approximately an equilibrium state with the pressure of the working fluid in the pressure introducing chamber A which is constructed by the spaces A1 and A2. Further, in the case that the fluid pressure within the piping of the fluid pressure line is lowered from this state, the metal bellows 2 is compressed so that the volumetric capacity of the gas chamber B is enlarged and the pressure thereof forms approximately an equilibrium state with the pressure of the working fluid in the pressure introducing chamber A.

The bellows cap 22 of the metal bellows 2 is restricted its movement in the compressing direction of the metal bellows 2 by the bottom portion 31 of the stay 3 via the seal member 26 at a time point that the fluid pressure within the pressure introducing chamber A is lowered to a predetermined value, whereby the compression of the metal bellows 2 is restricted. Further, at this time, the communication hole 31a is closed on the basis of the close contact of the seal member 26 with the bottom portion 31 of the stay 3, and the spaces A1 and A2 are obstructed therebetween in the pressure introducing chamber A. As a result, even if the fluid pressure in the fluid pressure line is thereafter lowered further, the pressure in the space A2 between the stay 3 and the metal bellows 2 is not lowered, but is kept in a state of being pressure equalized with the gas chamber (the outer peripheral space B1 of the bellows main body 21). Therefore, any excessive load does not act on the bellows main body 21 of the metal bellows 2 on the basis of the differential pressure.

Further, the deflection in the radial direction is generated in the metal bellows 2 in conjunction with the expanding and contracting operation as mentioned above. In the case that the vibration is a stationary wave in which the fixed end 21a of the bellows main body 21 is set to the node and the free end 21b is set to the antinode, the vibrating displacement (the eccentric motion) in the radial direction of the free end 21*b* is restricted by the vibration damping ring 23. As a result, it is possible to effectively prevent the vicinity of the free end 21*b* of the bellows main body 21 from being damaged by coming into contact with the inner peripheral surface 11*a* of the shell 11 in the outer shell 1.

Further, in the case that the vibration in the radial direction in conjunction with the expansion and contraction of the metal bellows 2 is a stationary wave in which the fixed end 21*a* and the free end 21*b* of the bellows main body 21 are set to the node, and the intermediate portion in the axial direction is set to the antinode, an outer peripheral surface of the tubular portion 213 formed in the intermediate portion in the axial direction of the bellows main body 21 comes into contact with the inner peripheral surface 11*a* of the shell 11 in the outer shell 1 in advance in the course of the vibrating displacement, and suppresses the further eccentric motion. As a result, it is possible to effectively prevent the maximum diameter portion of each of the peak portions 211 of the bellows main body 21 from being damaged by coming into contact with the inner peripheral surface 11*a* of the shell 11. Further, since the tubular portion 213 has the predetermined width w in the axial direction as shown in FIG. 2 which is previously described, the contact area with the inner peripheral surface 11*a* of the shell 11 is great, and the load applied to the tubular portion 213 itself can be accordingly reduced effectively.

The deflection in the radial direction tends to be generated in the metal bellows 2 in the metal bellows type accumulator of "external gas structure" as shown in FIG. 3, in comparison with the accumulator of "internal gas structure" as shown in FIG. 1 which is previously described. Therefore, the effect of the present invention is further remarkable in the metal bellows type accumulator of "external gas structure".

Figure 4:
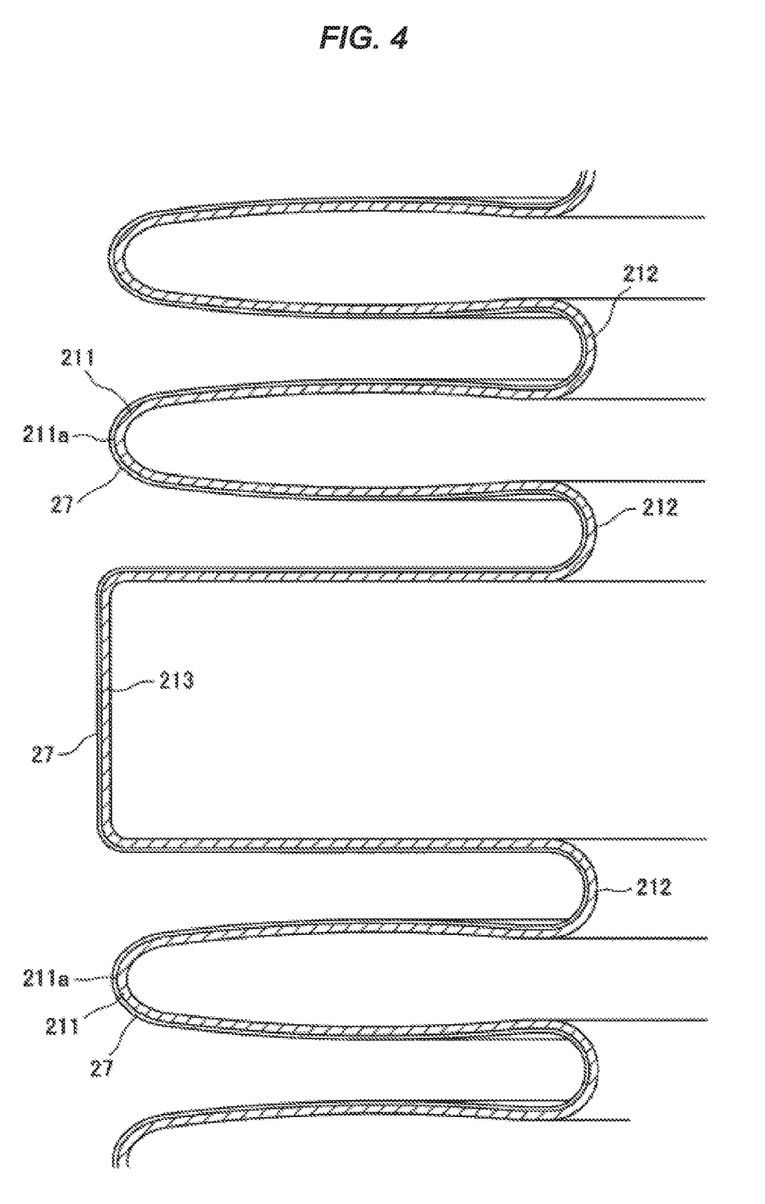
FIG. 4 is a cross sectional view showing a substantial part in a third embodiment of the metal bellows type accumulator according to the present invention.

FIG. 4 shows a third embodiment of the metal bellows type accumulator according to the present invention. The embodiment is structured such that a protection layer 27 made of a rubber elastic body or a synthetic resin and formed into a thin film is attached to the outside surface of the bellows main body 21 including the tubular portion 213 in the metal bellows 2 in the first embodiment or the second embodiment mentioned above.

According to the structure mentioned above, since the eccentric motion of the metal bellows 2 is continued after the tubular portion 213 formed in the intermediate portion in the axial direction of the bellows main body 21 in the metal bellows 2 comes into contact with the inner peripheral surface of the outer shell, the maximum diameter portion 211*a* of each of the peak portions 211 is coated with the protection layer 27 even if the bellows main body 21 comes into contact with the inner peripheral surface of the outer shell. As a result, the impact applied to the maximum diameter portion 211*a* of the peak portion 211 can be effectively reduced.

Further, since the outer peripheral surface of the tubular portion 213 is also covered with the protection layer 27, it is also possible to effectively reduce the impact applied to the tubular portion 213 itself which comes into contact with the inner peripheral surface of the outer shell in advance.

In the example shown in FIG. 4, all the areas of the outer surfaces of the peak portions 211 and the trough portions 212 in the bellows main body 21 is coated with the protection layer 27, however, only the outer peripheral surface of the maximum diameter portion 211*a* in the peak portion 211 and the outer peripheral surface of the tubular portion 213 may be coated with the protection layer 27.

What is claimed is:

1. A metal bellows type accumulator comprising:
an outer shell having a first end that defines a pressure introducing passage and a second end, the outer shell defining an inner chamber; and
a metal bellows provided in the outer shell and extending axially between the first end and the second end, the metal bellows along an axial length thereof having a plurality of alternating peaks that extend radially outward toward an inner peripheral surface of the outer shell and troughs that extend radially inward toward an interior of the outer shell that permit the metal bellows to expand and contract in an axial direction, and the metal bellows separating the inner chamber into a pressure introducing chamber that communicates with the pressure introducing passage and a gas chamber that is charged with cushion gas;
wherein as the metal bellows extends from the first end toward the second end of the outer shell, the plurality of peaks and troughs transition into a tubular portion at a position of the metal bellows where an amplitude of vibration in a radial direction is at a maximum,
the tubular portion has a diameter that is greater than a maximum outer diameter of each of the peaks such that the tubular portion is configured to contact the inner peripheral surface of the outer shell, and the tubular portion has a predetermined width along the axial direction.

2. The metal bellows type accumulator according to claim 1, wherein an outer peripheral surface of the peaks are coated with a protection layer which is constructed by a cushioning material.

3. The metal bellows type accumulator according to claim 1, wherein an outer peripheral surface of the tubular portion is coated with a protection layer which is constructed by a cushioning material.

4. The metal bellows type accumulator according to claim 2, wherein an outer peripheral surface of the tubular portion is coated with a protection layer which is constructed by a cushioning material.

* * * * *